United States Patent [19]

Kobak et al.

[11] Patent Number: 5,476,362
[45] Date of Patent: Dec. 19, 1995

[54] CAN LID DOWNSTACKER MECHANISM

[75] Inventors: Roger L. Kobak, Aurora; Clinton W. Rutledge, Lakewood, both of Colo.

[73] Assignee: Preferred Machining Corp., Englewood, Colo.

[21] Appl. No.: 17,803

[22] Filed: Feb. 16, 1993

[51] Int. Cl.[6] .................................................. B65G 59/06
[52] U.S. Cl. ...................... 414/797.7; 221/17; 221/222; 414/798.1
[58] Field of Search .............................. 221/17, 93, 131, 221/222, 258, 124; 141/797.7, 798, 798.1

[56] References Cited

U.S. PATENT DOCUMENTS

| | | |
|---|---|---|
| 1,126,194 | 1/1915 | Graham . |
| 1,161,931 | 11/1915 | Dixon . |
| 1,415,937 | 5/1922 | Lippitz . |
| 2,184,029 | 12/1939 | Wicklund .............................. 113/114 |
| 2,659,522 | 11/1953 | Ninneman et al. ................. 221/222 X |
| 2,743,001 | 4/1956 | Nordquist ..................... 198/66 |
| 3,158,289 | 11/1964 | Van Brunt ............................. 221/116 |
| 3,253,722 | 5/1966 | De Gear . |
| 4,215,799 | 8/1980 | Swaine ..................................... 221/93 |
| 4,262,629 | 4/1981 | McConnellogue et al. ............ 118/668 |
| 4,558,802 | 12/1985 | Molison ............................. 221/222 X |
| 5,113,636 | 5/1992 | Mihara et al. ....................... 221/222 X |

Primary Examiner—Michael S. Huppert
Assistant Examiner—Janice L. Krizek
Attorney, Agent, or Firm—John E. Reilly

[57] ABSTRACT

A dual downstacker apparatus has adjacent can lid feed chutes for advancing lids one at a time into alternate ones of the pockets or recesses on a starwheel which is continuously rotated beneath the chutes; and the delivery of lids can be interrupted through one of the chutes without interrupting advancement through the other of the chutes.

15 Claims, 5 Drawing Sheets

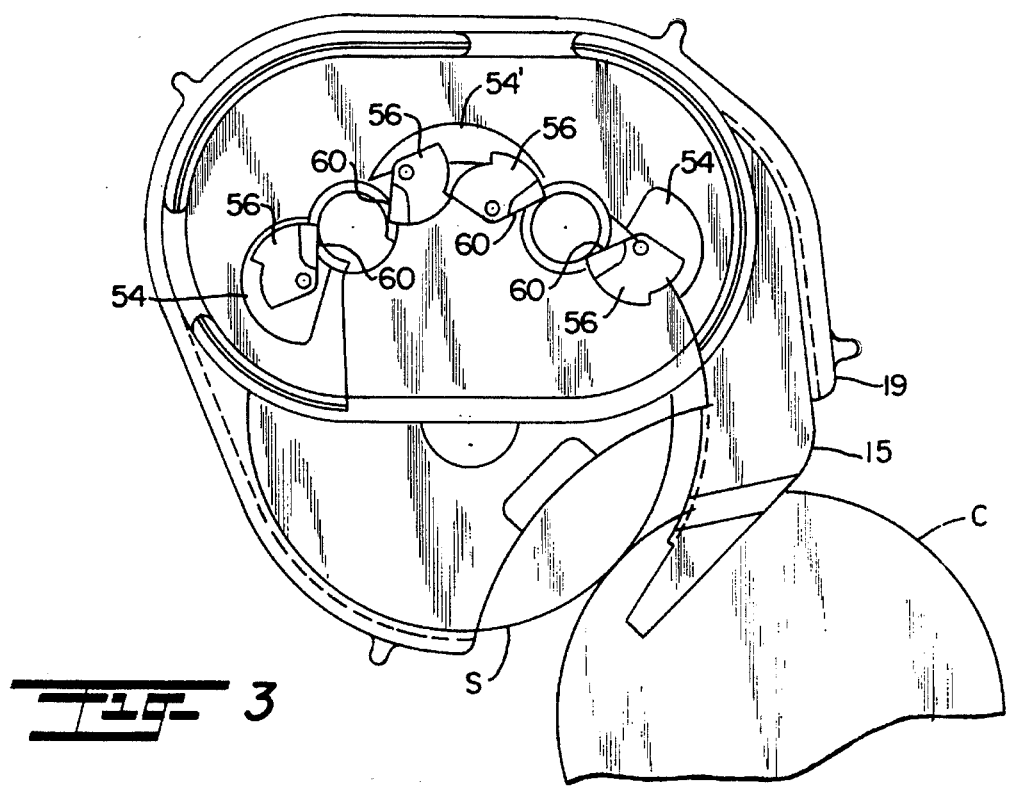
_FIG_ 3
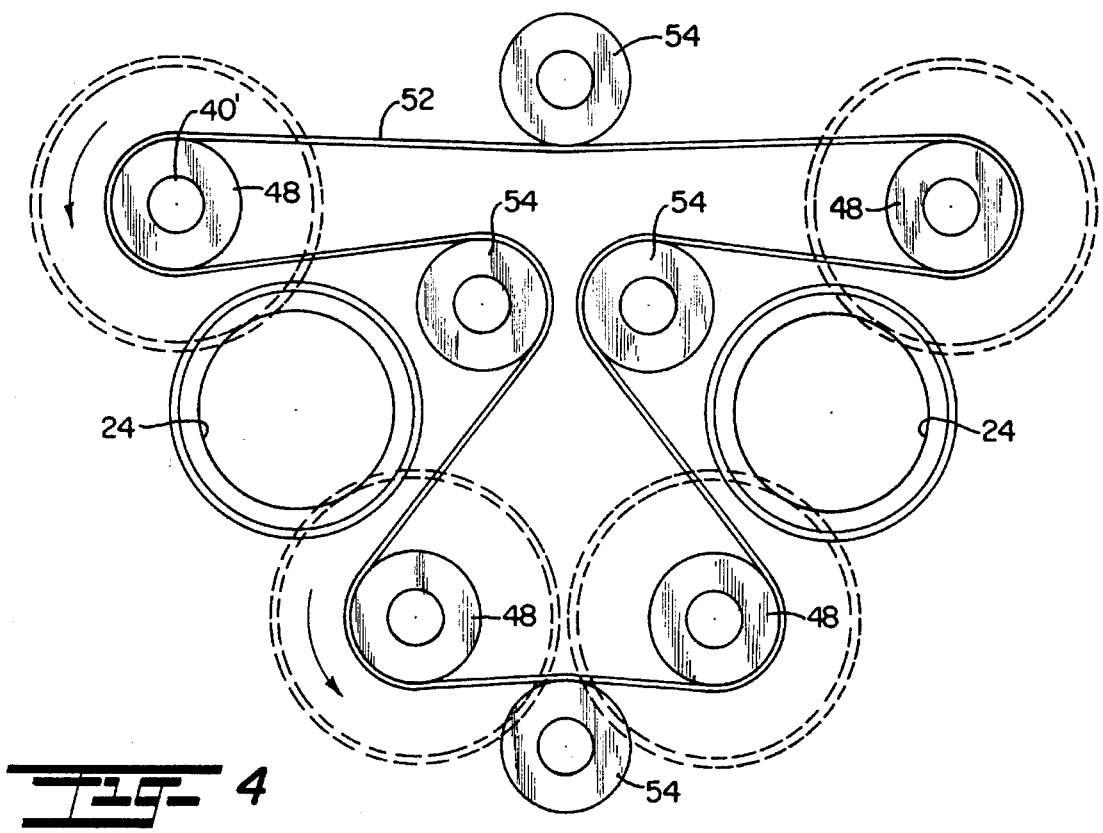
_FIG_ 4

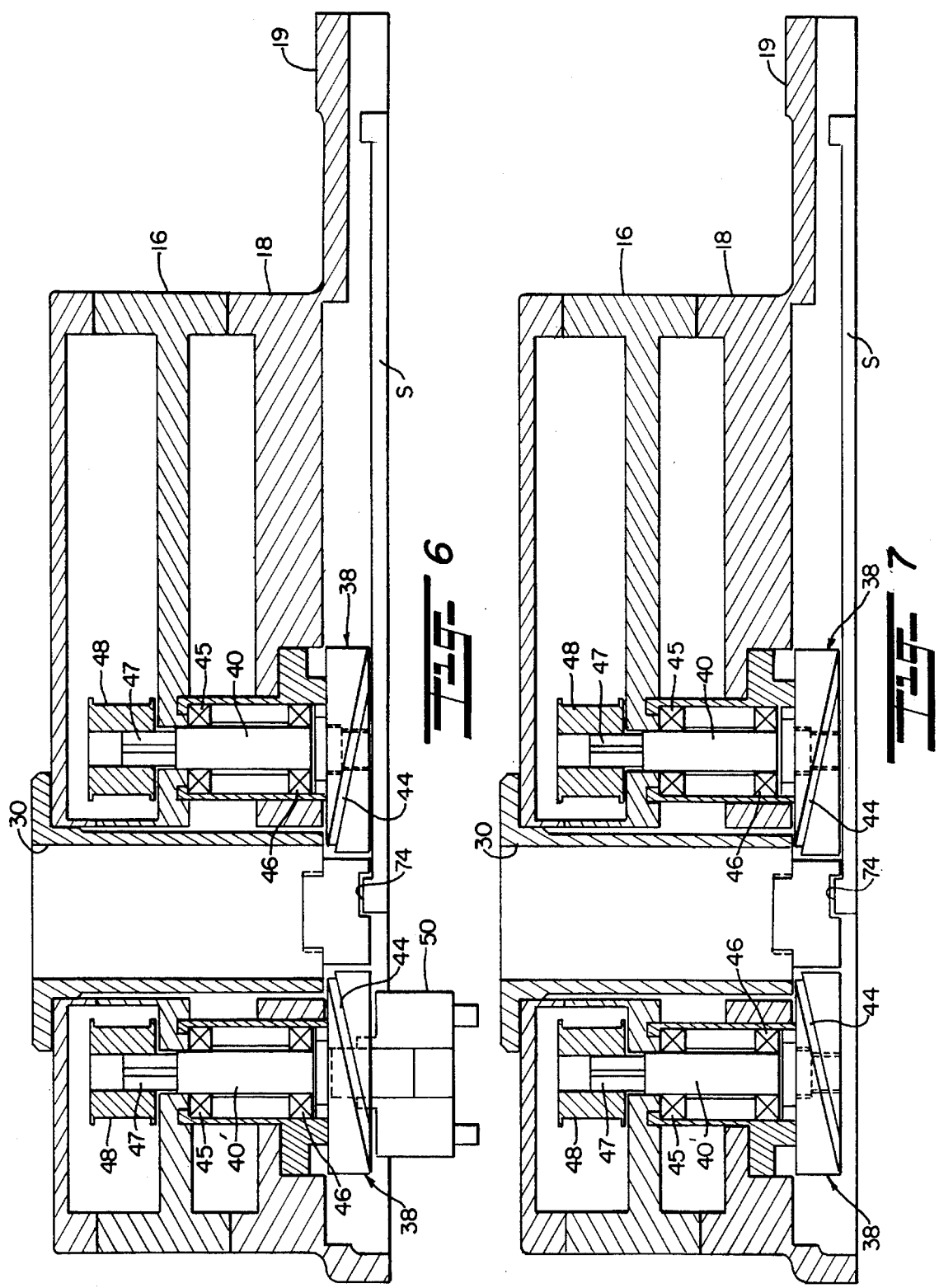

CAN LID DOWNSTACKER MECHANISM

This invention relates to end closure handling devices; and more particularly relates to novel and improved apparatus for feeding end closures, such as, can lids synchronously from a plurality of stacks to a transfer table for subsequent handling or treatment.

BACKGROUND AND FIELD OF INVENTION

The present invention is concerned with the handling of can end closures or lids, for example, as a preliminary to delivery of the lids into an end seaming operation for can bodies. Typically, the lids are supplied in sticks consisting of a stack of such lids which are placed in a downstacker mechanism and individually fed from the bottom onto a starwheel for transfer onto a rotary table where sealant is applied to the lid as a preliminary to delivery of each lid to the end seaming operation. For instance, U.S. Pat. No. 4,262,629 to McConnellogue et al, assigned to the assignee of this invention, sets forth and describes an end lining mechanism for the application of sealant to the can lids and which includes a single downstacker mechanism for successively advancing can lids into the end lining table.

A continuing problem encountered in the handling of can lids is the high rate of speed required for their delivery in order to coordinate with the rest of the can-forming operation; and, when feed screws are employed to advance each lid into registry with a starwheel, has in the past required a full revolution of the feed screws before the lid would clear the downstacker and be free to advance with the rotating starwheel. In order to employ two or more downstackers along the path of travel of the starwheel not only requires close coordination in the timing of delivery of lids from each downstacker into alternate pockets of the starwheel but modification of the feed screws and more positive advancement of the lid into each pocket in order to minimize the possibility of jamming. Furthermore, it is desirable to reduce the speed of rotation of the feed screws without reducing the rate of delivery of lids from each stack onto the starwheel; and to be able to deliver lids from one stack in the event that the supply of lids becomes depleted in the other stack so that the entire downstacker operation need not be suspended.

It has been proposed to provide end feeding devices wherein the can lids can be successively removed from dual stacks and fed into a transfer mechanism or table. Typically, however, each stack must be rotated into alignment with the transfer mechanism and reference is made to U.S. Pat. No. 3,253,722 to DeGear for that approach to end closure feeding apparatus. Other patents of interest in this field are U.S. Pat. Nos. 1,126,194 to C. W. Graham, 1,161,931 to J. W. Dixon, 1,415,937 to W. Lippitz, 2,184,029 to S. Wicklund, 2,743,001 to R. E. J. Nordquist and 3,158,289 to L. C. Van Brunt. However, the systems disclosed in these patents are not capable of alternately feeding lids from a pair of stationary downstacks in the path of travel of the starwheel, nor are they capable of continuously supplying can lids from one downstacker in the event that the supply of lids should become depleted in the other downstacker.

SUMMARY OF INVENTION

It is therefore an object of the present invention to provide for a novel and improved apparatus for sequentially feeding can lids from multiple stacks of lids.

It is another object of the present invention to provide apparatus for sequentially feeding can lids from dual stacks of lids wherein the lids can be selectively fed and transferred from each stack independently of lid removal from the other stack.

It is a further object of the present invention to provide apparatus for sequentially feeding can lids from dual stacks of lids in which the advancement of the lids through each stack can be interrupted without affecting the operation and removal of lids from the other stack; and further wherein the apparatus lends itself for use in high speed operations and permits continuous feeding and transfer of lids irrespective of interruption of lids from one of the stacks.

In accordance with the present invention, a downstacker apparatus has been devised for sequentially dispensing can lids from adjacent stacks of lids onto a series of can lid-receiving recesses advancing beneath the stacks for delivery of the can lids to another station, the improvement comprising a plurality of upright can feed chutes each chute retaining one of the stacks of can lids therein, lid dispensing means at the lower end of each chute for advancing a lid from the lower end into registry with one of the recesses, guide means cooperating with the can lid-receiving recesses for advancing each can lid away from the lower end of each chute to the other station, and synchronizing means for synchronizing activation of the dispensing means whereby a lid is advanced from each chute in succession into the recesses.

In normal operation, the feed rate of lids from each stack can be reduced to substantially below that required for a single stack to deliver the same number of lids by accelerating the pitch of the helical screws which define the lid dispensing means so that the reduced speed of rotation is compensated for by the increased rate of axial travel or advancement of the lids through each chute, the net effect being that the lids are advanced downwardly through each chute at the same rate of speed notwithstanding the reduced rate of rotation of the helical screws. Feed interrupt means is provided to selectively interrupt advancement of a lid from each of the stacks so that it is possible to interrupt feeding of lids from one stack independently of the other stack. The guide means includes a common guide track, deflector and pusher plate for guiding the lids in succession from each of the stacks onto a transfer table for subsequent handling or treatment of the lids.

The above and other objects of the present invention will become more readily appreciated and understood from a consideration of the following detailed description of a preferred form of the present invention when taken together with the accompanying drawings in which:

BRIEF DESCRIPTION OF THE DRAWINGS

FIG. 3 is a plan view of the downstacker housing of the preferred form with portions broken away to illustrate the cut-off blades;

FIG. 4 is a plan view enlarged illustrating a preferred form of power transmission drive for the feed mechanism of the present invention;

FIG. 6 is a cross-sectional view through one of the downstacker chutes;

FIG. 7 is a cross-sectional view through another of the downstacker chutes; and

DETAILED DESCRIPTION OF PREFERRED EMBODIMENT

Referring in more detail to the drawings, a preferred form of downstacker mechanism 10 is illustrated in FIGS. 1 to 8 for use in connection with the transfer of can lids L onto a starwheel designated at S which has semicircular recesses or receivers R, each receiver R receiving a lid as it is delivered from the lower end of the downstacker mechanism for advancement to another handling, combining or treating station. In this case, the downstacker mechanism is illustrated specifically for use in supplying lids to an end lining mechanism, not shown, but which includes a chuck assembly and a plurality of sealant applicators to line the grooves in each lid with a sealant as a preliminary to an end seaming operation where each lid is applied to a can body.

Figure 1:
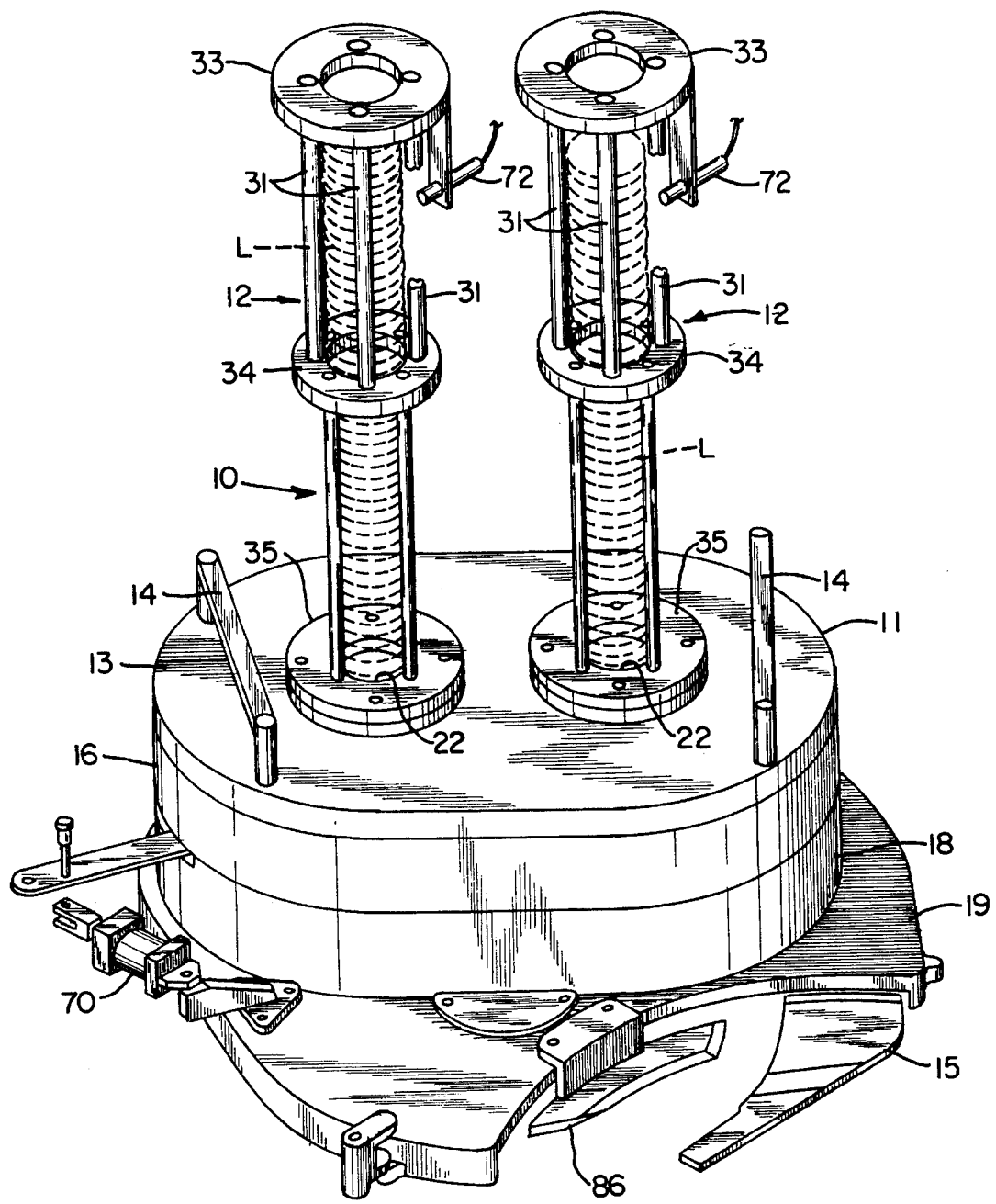
FIG. 1 is a perspective view of a preferred form of dual downstacker mechanism in accordance with the present invention.
Figure 2:
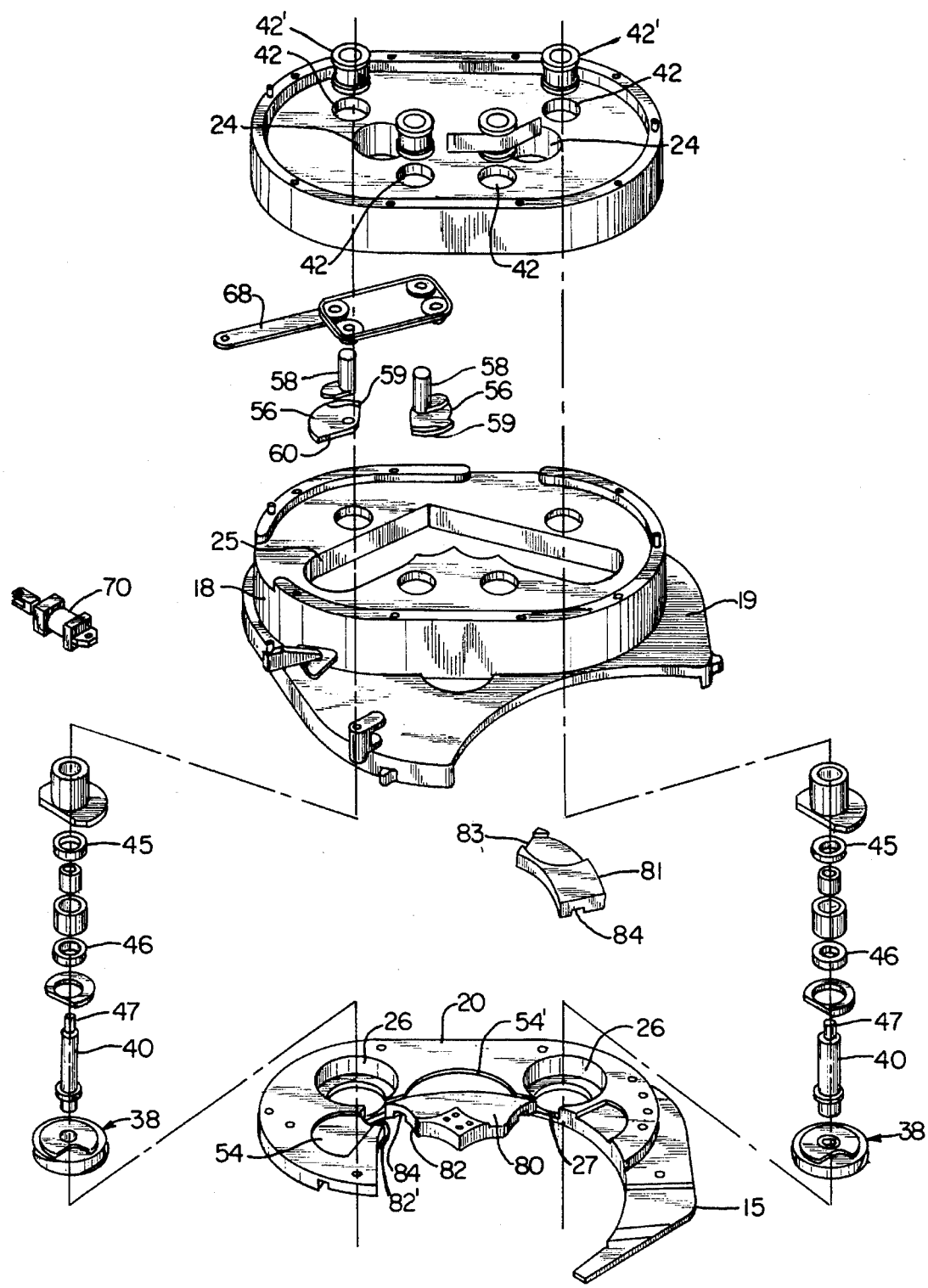
FIG. 2 is an exploded view of the dual downstacker mechanism shown in FIG. 1.

FIGS. 1 to 3 illustrate the overall construction and arrangement of the mechanism 10 which includes an outer housing 11, a pair of downstacker chutes 12, a cover plate 13, lift handles 14 and a guide track 15. As best seen from FIG. 2, the housing 11 contains an upper support plate or compartment 16, and a middle compartment 18 having a cover plate 19 which fits over a lower arcuate guide plate 20, all of which are assembled together with the outer edges of the members 13, 16 and 18 defining the outer vertical wall of the housing 11, and the guide track 15 defines an arcuate extension of the guide plate 20.

In order to mount the chutes 12 in upright positions and in spaced parallel relation to one another within the housing 11, the cover plate 13 has spaced openings 22, each opening 22 aligned with an opening 24 in the compartment 16, and further aligned with a V-shaped recess 25 in the compartment 18 as well as the cavities 26 in the plate 20. Each of the chutes 12 correspondingly includes a tubular member 30 which extends downwardly through the aligned openings, as shown in FIGS. 6 and 7, and an upper cage has circumferentially spaced rods 31 and outer vertically spaced rings 33, 34 and 35 surrounding the rods, the cage extending upwardly from the tubular member 30 and above the housing 11. A stack of lids L is inserted upside down into each chute 12 such that the longitudinal axis of each chute extends through the centers of the lids L and with the lowermost lid resting at the lower terminal edge of the tube 30 just above the lower guide plate 20.

In order to dispense the can lids L from each chute 12, a pair of feed screws 38 are disposed on diametrically opposed sides of each chute 12, each of the feed screws 38 being fixed for rotation at the lower end of a drive shaft 40 which extends downwardly through a bore 42 in the compartment 16 and the recess 25 in the compartment 18, one of the shafts defining a primary drive shaft 40'. Each feed screw 38 has a threaded portion in the form of a helical groove 44 engageable with an edge or rim of the lowermost lid L in a stack, and each feed screw 38 is seated in one of the cavities 26 so that the helical grooves 44 will intrude into the path of movement of the lids L. Thus, each pair of feed screws have helical portions 44 which engage diametrically opposed locations on the rim of the lowermost lid. The slots or portions 44 are of the same hand and of an accelerated pitch so that, when the feed screws are rotated in the same direction, they will cause the engaged lid to advance downwardly in an axial direction into one of the recesses R in response to rotation of the feed screws through 180° or one-half of a complete revolution. In this way, the speed of rotation of the feed screws can be reduced while delivering the same number of lids from each chute to more easily synchronize the advancement of the lids into alternate pockets or recesses R of the starwheel S. Guide or deflector shoes 80 and 81 are disposed on the guide plate 20 beneath the trailing or downstream side of each chute 12. The shoe 80 includes a concave edge or deflector surface 82 in spaced, diametrically opposed relation to a first concave edge 82' at one end of the guide plate 20, and a rim portion of each lid L will advance from the chute 12 and be guided by the edges 82, 82' into positive seating engagement with the pocket R, as best seen from FIGS. 2, 6 and 7. The shoe 81 similarly includes a concave edge 83 in spaced diametrically opposed relation to a second concave edge on the shoe 80 to perform the same guide function as the first edge 82 and the edge 82'. The shoes 80, 81 cooperate with a raised ledge 74 on one edge of the pocket R in urging each lid into a recess R, the ledge 74 advancing through a curved slot 84 in the underside of each of the shoes 80 and 81. A deflector shoe 86 is disposed at one edge of the cover plate 19 to assist in retaining each lid in its recess as it exits the downstacker mechanism.

As further illustrated in FIGS. 6 and 7, each of the shafts 40 and 40' is journaled in bearings 45 and 46, and the shaft 40 has an upper end 47 which is keyed for rotation with a cog gear 48 disposed in the upper compartment 16. In order to correlate the rotation of the shafts 40 and 40' with the rotation of the starwheel S, the primary drive shaft 40' has a pin coupling 50 at its lower end to which is drivingly connected one of the power transmission shafts, not shown, of the end lining mechanism in accordance with conventional practice and, for example, as illustrated and described in the hereinbefore referred to U.S. Pat. No. 4,262,629 incorporated by reference herein. As shown in FIG. 4, a timing belt 52 in the upper compartment 16 is trained over the cog gears 48 and a series of tension-adjustable idler rollers 54 in order to synchronously rotate the shafts 40 and their feed screws 38 in response to rotation of the primary drive shaft 40'.

Figure 8:
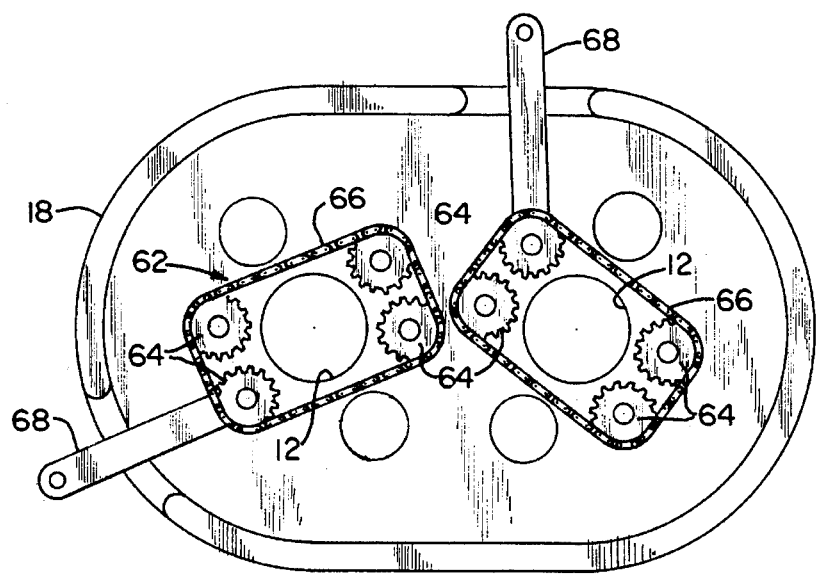
FIG. 8 is a plan view of a portion of the interrupt mechanism employed in accordance with the present invention.

In order to interrupt advancement of the lids L through each chute 12, a cut-off blade member 56 is mounted on a shaft 58 to rest in one of the depressions 54 and 54' flanking or adjacent to the notched portion 27 in the guide plate 20. Each blade member 56 is of generally semi-circular configuration with a straight edge 60 extending across one end of the blade 56 and a notched or cut-out portion 59 to afford clearance between adjacent blades 56 in the intermediate area between the chutes 12. The blades 56 are turned by a chain drive 62, as shown in FIG. 8, there being a common chain drive 62 for each pair of blade members 56 for each one of the chutes 12. Each chain drive 62 is made up of a series of four sprockets 64, there being two sprockets each on diametrically opposed sides of the chute 12 and one sprocket of the pair being keyed for rotation on the bushing 58, and a chain member 66 is trained over the sprockets 64. Each chain member is independently advanced to impart rotation to the sprocket 64 by a lever arm 68 extending outwardly from one of the sprockets through an opening in the wall of the middle compartment 18 so as to cause the blade members 56 to rotate through a substantially 90° angle in advancing into the path of movement of the stack of lids directly above the feed screws 38. Preferably, rotation is imparted to the blade members 56 for each chute by a pneumatic cylinder 70, FIG. 1, and which is activated by a sensor or microswitch 72 at the upper end of the downstacker chute 12. Each of the cylinders 70 is independently controlled by a separate microswitch 72 in order to be able to interrupt advancement of lids through each chute independently of the other chute 12.

Figure 5:
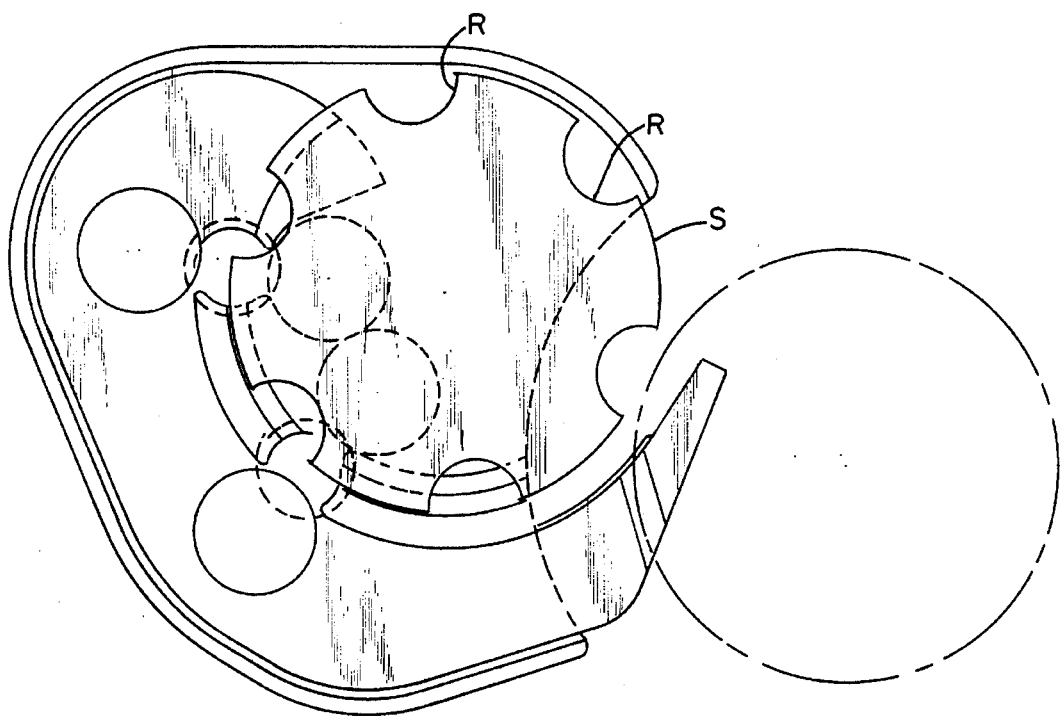
FIG. 5 is a bottom plan view of the guide track for advancing can lids from the downstacker mechanism to another station.

In operation, it is important to maintain a relatively full stack of lids in each chute 12; otherwise, if the lids L in either chute 12 become depleted, it is very difficult to feed a fresh supply of the lids L into the chutes 12 without damaging them when, for example, they are supplied from one or more lanes in a typical can forming operation. Accordingly, the sensor 72 at the upper end of each chute 12 will sense when the lids move down below a particular level in the upper cage and will activate the associated cut-off blades 56 to interrupt feeding of the lids from that chute. For example, when lids L are being fed from two lanes at different rates of speed into the chutes 12, rather than permitting the lids L to continue to be fed from the chute until the stack is depleted, the cut-off blade members 56 are activated to interrupt delivery until the slower lane catches up and will feed lids into both chutes at the same rate. As illustrated in FIGS. 3 and 5, each lid is positively driven or advanced by the feed screws 38 so as to be captured between the concave edge of the shoes 80, 81 and the guide plate 20, and the raised ledge or pusher member 74 at one edge of each recess R will assist in advancing each lid along the guide track into the next station, for example, a chuck assembly C as represented in FIG. 3. Whenever the feed from one chute 12 is interrupted, the feed screws 38 will continue to operate for both chutes but lids will be fed only from the other chute which has not been interrupted so that it is not necessary to deactivate the entire operation. In the event of jamming, it is necessary to turn off the entire downstacker operation in which event the housing 11 can be easily lifted off of the guide plate by means of lift handles to correct any jamming or related problem.

It is therefore to be understood that while a preferred embodiment of the present invention is herein set forth and described, various modifications and changes may be made therein without departing from the spirit and scope of this invention as defined by the appended claims and reasonable equivalents thereof.

We claim:

1. In downstacker apparatus for sequentially dispensing can lids from adjacent stacks of lids into a series of receivers advancing beneath said stacks, the improvement comprising:

a plurality of generally upright can lid feed chutes, each said chute retaining one of said stacks of can lids therein;

lid feed means at a lower end of each of said chutes for advancing a lid from the lower end into registry with one of said receivers;

guide means cooperating with each of said receivers in advancing each said can lid away from the lower end of each said chute to another station for treatment or handling; and synchronizing means for synchronizing activation of said lid feed means for advancing one of said lids from the lower end of each of said chutes at the same time into registry with alternate ones of said receivers.

2. In apparatus according to claim 1, including feed interrupt means for selectively interrupting advancement of a lid from one of said stacks without interrupting advancement of said lids from other of said stacks.

3. In apparatus according to claim 2, said feed interrupt means including cut-off blades, each said cut-off blade including means movable into and away from engagement with a lower end of said stack, and activating means for moving said cut-off blades into engagement with a can lid at the lower end of said stack to support the lids above said can lid.

4. In apparatus according to claim 1, said guide means including an arcuate guide track and a guide shoe aligned beneath each said chute whereby each said can lid in succession is advanced between said guide track and one of said receivers.

5. In apparatus according to claim 1, said lid feed means including rotatable feed screw members on diametrically opposed sides of each said chute engageable with a lowermost can lid in each said stack, each of said feed screw members including helically grooved portions disposed in a cavity in said guide means, said guide means including notched portions between each said cavity and said chute, each said helically grooved portion intruding through said notched portion for engagement with said lowermost can lid in said chute.

6. In apparatus according to claim 5, said synchronizing means including a timing belt trained over a plurality of gear members for each of said feed screw means for said plurality of chutes, and drive means for driving said timing belt to synchronously rotate said feed screw means for said plurality of chutes.

7. In apparatus for sequentially feeding can lids to a rotating starwheel having circumferentially spaced, can-lid receiving recesses at spaced intervals around its outer peripheral edge, the improvement comprising:

a housing;

a pair of upright can lid feed chutes in closely spaced, parallel relation to one another in said housing, each said chute retaining a stack of can lids therein;

guide means for guiding said can lids from a lower end of each of said chutes into one of said can lid-receiving recesses, said guide means including an arcuate guide plate at the bottom of said housing in substantially horizontal alignment with said starwheel;

lid feed means at the lower end of each said chute for advancing a lid from the lower end into registry with one of said recesses; and synchronizing means for synchronizing activation of said lid feed means whereby to advance one of said lids from the lower end of each of said chutes at the same time into registry with alternate ones of said recesses.

8. In apparatus according to claim 7, including feed interrupt means for selectively interrupting advancement of a lid from one of said stacks without interrupting advancement of said lids from the other of said stacks.

9. In apparatus according to claim 8, said feed interrupt means including cut-off blades, each said cut-off blade movable into and away from engagement with the lower end of said stack, and activating means for moving said cut-off blades into engagement with a can lid at the lower end of one of said stacks independently of advancement of said lids from said other stack.

10. In apparatus according to claim 8, said housing including an upper compartment housing said synchronizing means, and an intermediate compartment housing said feed interrupt means.

11. In apparatus according to claim 10, said synchronizing means including a timing belt trained over a plurality of gear members for each of said lid feed means for said plurality of chutes, and drive means for driving said timing belt to synchronously rotate said lid feed means.

12. In apparatus according to claim 7, said lid feed means including feed screw members on diametrically opposed sides of each said chute, each said feed screw member provided with a threaded portion having a pitch which will cause each engaged lid to advance downwardly in an axial direction into one of said recesses in response to rotation of said feed screw members through less than a full revolution, and said synchronizing means continuously rotating said feed screw members to successively advance said lids into alternate ones of said recesses.

13. In apparatus according to claim 12, said guide means including a guide shoe aligned beneath each of said chutes cooperating with said guide plate in advancing each said can lid in succession into said recesses.

14. In apparatus according to claim 13, wherein said starwheel is provided with a raised portion along an edge of each said recess cooperating with said guide means, said guide means being stationary with respect to said rotating starwheel and said raised portion movable through slotted portions in said guide means.

15. In apparatus according to claim 12, each said threaded portion being of a pitch which will advance each lid in succession downwardly into one of said recesses in response to rotation of said feed screw member through one-half of a complete revolution of said member.

* * * * *